UNITED STATES PATENT OFFICE 2,422,730

FLAMEPROOFED FILM AND PROCESS

William A. Hoffman, Wilmington, Del., assignor to E. I. du Pont de Nemours & Company, Wilmington, Del., a corporation of Delaware No Drawing. Application August 15, 1944, Serial No. 549,628

5 Claims. (Cl. 117—136)

This invention relates to the production of regenerated cellulosic structures. More particularly, it relates to a method for the production of regenerated cellulose films that are both highly durable and flame-resistant.

In the production of regenerated cellulose film for certain uses in which flame resistance is required, it has become a common practice to impregnate the structure with various salts of sulfamic acid either alone or mixed with certain hydroxylated softeners such as glycerol or ethylene glycol, as illustrated in U. S. Patents 2,212,152 and 2,142,116. Regenerated cellulose films so treated are not only flame-resistant, but they also possess a degree of softness and pliability that enables them to be used in a variety of applications. However, they lack the high degree of durability over a wide temperature range essential to certain uses, and if the amount of sulfamate and hydroxylated softener is increased to improve the durability of the film, the sulfamic acid salt tends to crystallize particularly at low temperatures and the film becomes hazy.

It is, therefore, an object of this invention to provide a simple, effective method for producing flame-resistant and durable regenerated cellulose films. Another object of this invention is to provide a flame-resistant regenerated cellulose film that is highly durable, particularly at low temperatures. It is a further object to provide a highly durable, flame-resistant regenerated cellulose film that will retain its transparency under variable conditions of humidity and temperature. These and other objects will more clearly appear hereinafter.

These objects are attained by the present invention which comprises incorporating in the regenerated cellulose film at least 20% by weight, based upon the weight of the film, of a salt of sulfamic acid and at least 10% of a hydroxyl-containing softening agent together with from 0.5% to about 5.0% of a formaldehyde-yielding agent.

Salts particularly suited to the purposes of this invention are those which are soluble in water at 25° C. to the extent of at least 10%. Among these may be mentioned in particular ammonium sulfamate; the alkali metal and alkaline earth metal salts of sulfamic acid, e. g., the sodium, potassium, lithium, calcium, strontium, barium salts; and the salts of sulfamic acid with amines such as methylamine, dimethylamine, ethylamine, ethylenediamine, etc. Ammonium sulfamate is the preferred salt and the invention will be specifically described with reference to this salt.

While glycerol is the preferred hydroxylated softener, it may be substituted with good result by other hydroxylated softeners for regenerated cellulose such as ethylene glycol, diethylene glycol, the polyethylene glycols, hexamethylene glycol, 1,2,5-pentanetriol, etc.

Formaldehyde in the form of commercial formalin or para-formaldehyde is preferred for use in this process. However, certain other formaldehyde-yielding materials, such as hexamethylene-tetramine or the partially condensed resinous reaction products of formaldehyde with urea, melamine, urethanes, guanidines, phenols, etc., also can be used.

In order to obtain the advantages of this invention at least 20% by weight of sulfamate, at least 10% by weight of hydroxylated softener, and at least 0.5% by weight of formaldehyde-yielding substance, based upon the weight of the film, must be employed. Best results are obtained by operating within the limits of from 20–25% ammonium sulfamate, 15–25% glycerol, and 1–3% formaldehyde.

The preferred method of practicing this invention consists in passing a regenerated cellulose sheet after a series of purifying, bleaching and washing operations through an aqueous bath containing the prescribed amount of ammonium sulfamate, glycerol and formaldehyde. After impregnation of the sheet, excess solution is removed and the film is dried in a suitable manner.

The temperature of the impregnating bath for treating the regenerated cellulose film may be varied from 25° C. to 75° C. as desired.

The more detailed practice of the invention is illustrated in the following example:

An impregnating bath is made up by dissolving in water the following ingredients: ammonium sulfamate 12.5% by weight, glycerol 12.5% by weight, and 5.4% of commercial formalin (37% formaldehyde). There is then immersed in or drawn through this bath, which is maintained at about 25° C., a sheet of regenerated cellulose film that has been desulfured, bleached and washed in the usual manner. The film remains in contact with this bath sufficiently long to impregnate the gel structure thoroughly with the solution. It then emerges from the bath, excess liquid is removed from the surface by means of squeeze rolls or doctor knives and the film is dried on a conventional roll drier. When dried, the film is found to contain about 50% of the softener mixture. It is flame resistant and is 4–5 times more durable (as determined by the tumbling test described in U. S. Patent 2,275,348)

than the flame-resistant film ordinarily produced by the process described in U. S. Patent 2,142,116. Moreover, the film possesses no tendency even on prolonged exposure at low temperatures or low humidities to become hazy because of a crystallization of the sulfamic acid salt. Contrasted with this, a regenerated cellulose film that had been treated in a similar bath composed of 12.5% of ammonium sulfamate and 12.5% glycerol, but with no formaldehyde present, became hazy within a few minutes after it was dried because of the crystallization of ammonium sulfamate.

The outstanding advantage of this invention over those flameproofing methods practiced in the art is that it is now possible to impregnate in regenerated cellulose film the regularly used sulfamic acid flameproofing compositions in high concentration to provide sheets which are not only flame-resistant, but are also very durable and which do not become hazy because of crystallization of softener in the film.

The above description is intended to be illustrative only, it being understood, of course, that any modification thereof, or variation therefrom which conforms to the spirit of the invention is intended to be included within the scope of the invention as defined in the appended claims.

I claim:

1. A non-fibrous, transparent, durable, flameproof regenerated cellulose film containing from 20%–25% by weight of a salt of sulfamic acid based upon the weight of the film, from 10%–25% by weight of an aliphatic polyhydric alcohol softener, and from 0.5%–5.0% by weight of a formaldehyde-yielding material.

2. A non-fibrous, transparent, durable, flameproof regenerated cellulose film containing from 20–25% by weight of ammonium sulfamate based upon the weight of the film, from 15–25% by weight of glycerol, and from 1–3% by weight of formaldehyde.

3. The process which comprises impregnating transparent regenerated cellulose film with an aqueous bath comprising a salt of sulfamic acid, an aliphatic polyhydric alcohol softener, and a formaldehyde-yielding material, the relative amounts of the constituents of the bath being so regulated that from 20%–25% by weight of the salt of sulfamic acid based upon the weight of the film, from 10%–25% by weight of an aliphatic polyhydric alcohol softener, and from 0.5%–5.0% by weight of formaldehyde-yielding material is incorporated in the film; and drying the film whereby to produce a transparent, flameproof, and highly durable film of regenerated cellulose.

4. The process which comprises impregnating transparent regenerated cellulose film with an aqueous solution of ammonium sulfamate, glycerol, and a formaldehyde-yielding material, the relative amounts of the constituents of the bath being so regulated that from 20%–25% by weight of ammonium sulfamate based upon the weight of the film, from 10%–25% by weight of glycerol, and from 0.5%–5.0% by weight of a formaldehyde-yielding material is incorporated in the film; and drying the film whereby to produce a transparent, flameproof, and highly durable film of regenerated cellulose.

5. The process which comprises passing transparent regenerated cellulose film through a bath consisting of water, 12.5% by weight of ammonium sulfamate, 12.5% by weight of glycerol, and 2% formalin based upon the weight of active formaldehyde, whereby to saturate the film with the bath, pressing the film to remove excess liquid and drying the film whereby to produce a transparent, flameproof, and highly durable film of regenerated cellulose.

WILLIAM A. HOFFMAN.

REFERENCES CITED

The following references are of record in the file of this patent:

UNITED STATES PATENTS

| Number | Name | Date |
| --- | --- | --- |
| 2,079,146 | Banigan | May 4, 1937 |
| 2,273,890 | Peters | Feb. 24, 1942 |
| 2,142,115 | Cupery | Jan. 3, 1939 |
| 2,142,116 | Cupery | Jan. 3, 1939 |
| 2,212,152 | Cupery | Aug. 20, 1940 |
| 2,316,496 | White | Apr. 13, 1943 |